Jan. 12, 1937.　　　　G. C. LEMBAS　　　　2,067,770
PROPELLER
Filed May 2, 1935　　　　2 Sheets-Sheet 1

George C. Lembas
INVENTOR
BY Victor J. Evans & Co.
HIS ATTORNEYS

Jan. 12, 1937. G. C. LEMBAS 2,067,770
PROPELLER
Filed May 2, 1935 2 Sheets-Sheet 2

George C. Lembas.
INVENTOR
BY Victor J. Evans & Co.
HIS ATTORNEYS

Patented Jan. 12, 1937

2,067,770

UNITED STATES PATENT OFFICE 2,067,770

PROPELLER

George C. Lembas, Chicago, Ill.

Application May 2, 1935, Serial No. 19,510

2 Claims. (Cl. 244—13)

My invention relates to aeronautics, and has among its objects and advantages the provision of an improved propeller.

Figure 1:
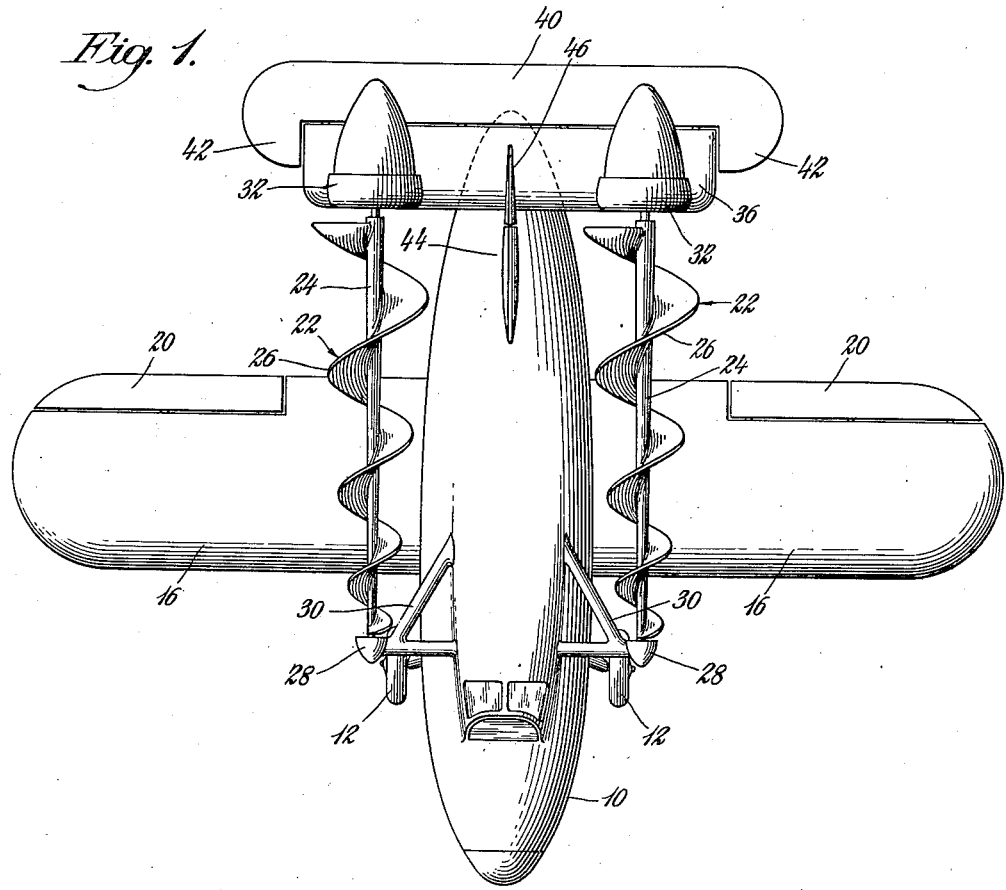
Fig. 1 is a top plan view of an airplane illustrating the invention.
Figure 2:
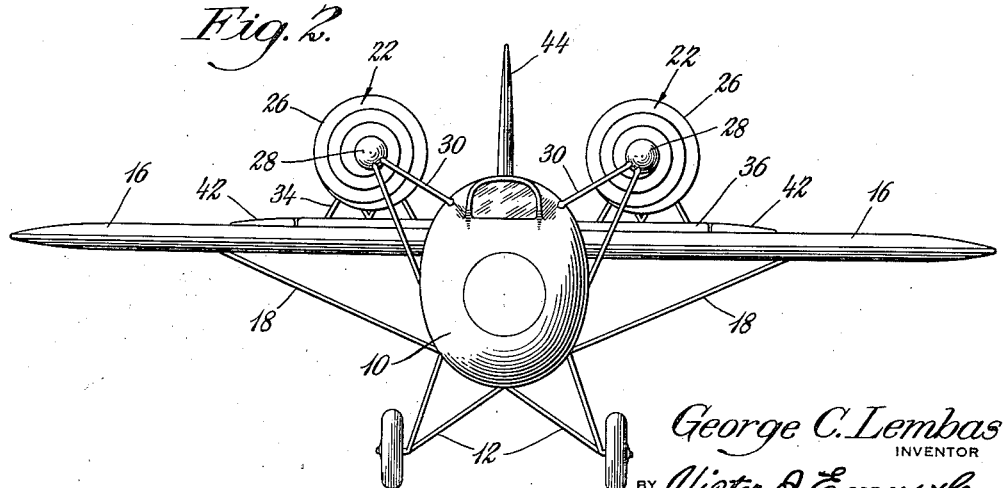
Fig. 2 is a front view.
Figure 3:
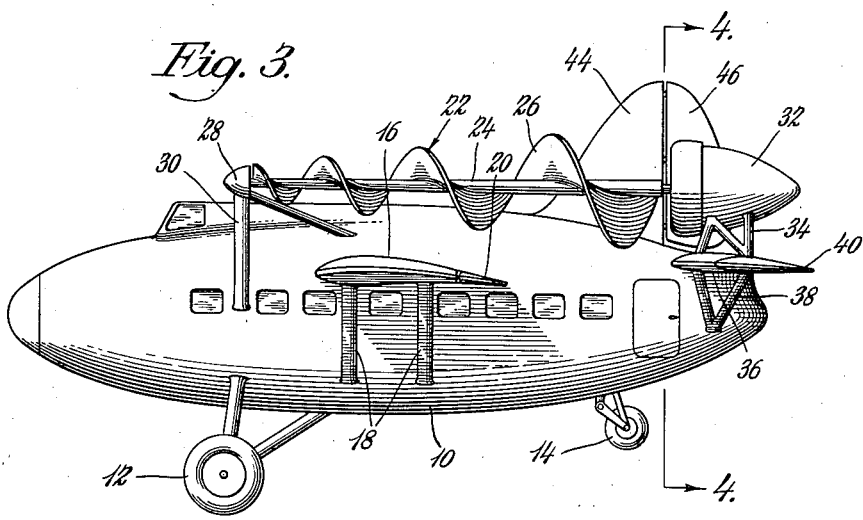
Fig. 3 is a side view.
Figure 4:
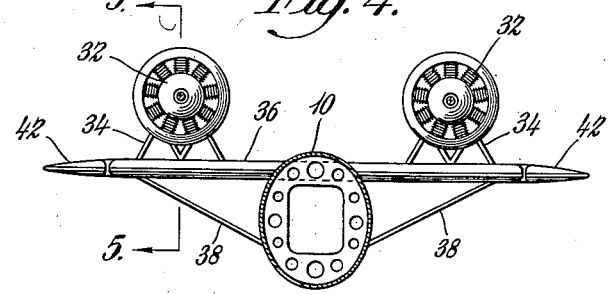
Fig. 4 is a sectional view along the line 4—4 of Fig. 3.
Figure 5:
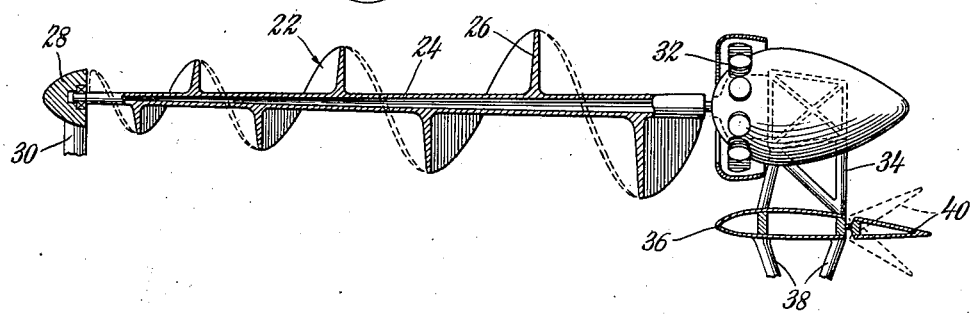
Fig. 5 is a sectional view of one of the screw propellers.

In the embodiment selected to illustrate my invention, I make use of a fuselage 10 of the cabin type. The fuselage is provided with a landing gear 12 and a rear supporting wheel 14. Wings 16 are secured to the fuselage in the usual way and through the medium of conventional struts 18. These wings are provided with ailerons 20 which are, of course, operated through the mechanism of conventional controls.

Two screws 22 are connected with the fuselage. Each screw comprises a shaft part 24 and a spiral blade 26. One end of each shaft is journaled in a bearing 28 carried by struts 30 secured to the fuselage. The opposite end of each shaft is connected with a motor 32 mounted upon struts 34 supported by a stabilizer 36 connected with the fuselage in the usual way and through the medium of struts 38. The screws 22 are identical in construction and increase in diameter rearwardly. The motors are operated through the medium of a conventional mechanism from a position inside the fuselage.

In Fig. 1, I illustrate the stabilizer 36 as embodying an area considerably larger than the conventional stabilizer so that the stabilizer performs a wing function in a degree. To the stabilizer 36, I connect an elevator 40 which is somewhat longer than the stabilizer and embodies extensions 42 extending partly along the ends of the stabilizer. Upon the fuselage 10, I mount a vertical fin 44 with which I associate a rudder 46. This rudder and the elevator 40 are, of course, operated through the medium of conventional controls.

In operation, the air engaged by the spiral vanes 26 is thrust backward by the vanes, thus giving a forward impulse to the screws and the airplane proper. The screws in operation are relatively noiseless as compared with conventional propellers. I connect the motors with the rear ends of the screws 22 so that an effective thrust reaction is attained because of the fact that the screws operate completely in advance of the motors. I design the stabilizer 36 so as to perform a wing function for the purpose of supporting the additional weight of the motors. My arrangement is such that easy access may be had to the motors because of their close association with the stabilizer, which may be used as a platform.

Without further elaboration, the foregoing will so fully explain my invention that others may, by applying current knowledge, readily adapt the same for use under various conditions of service.

I claim:

1. In an airplane, a fuselage, wings connected with the fuselage, a stabilizer connected with the rear end of the fuselage, said stabilizer embodying an area performing a wing function, motors carried by the stabilizer, and propelling means connected with the motors.

2. The combination of a fuselage, a plurality of propelling screws carried by the fuselage, said propelling screws being arranged in parallelism with the longitudinal axis of the fuselage and on opposite sides thereof, the screws having a generally tapered configuration with the small ends pointing forwardly of the fuselage, means for rotatably mounting the propelling screws upon the fuselage, a stabilizer carried by the rear end of the fuselage, said stabilizer being so proportioned as to perform a wing function, and a motor connected with the rear end of each screw, said motors being mounted upon said stabilizer.

GEORGE C. LEMBAS.